UNITED STATES PATENT OFFICE.

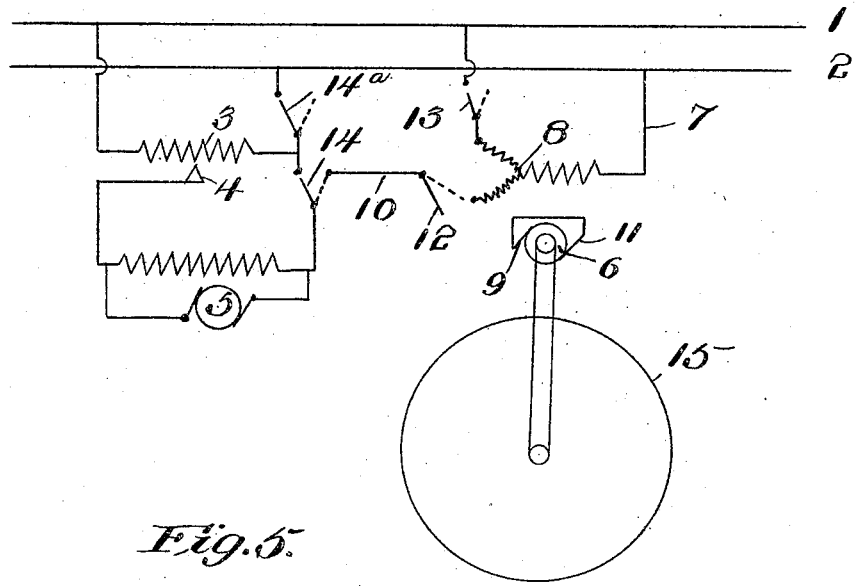
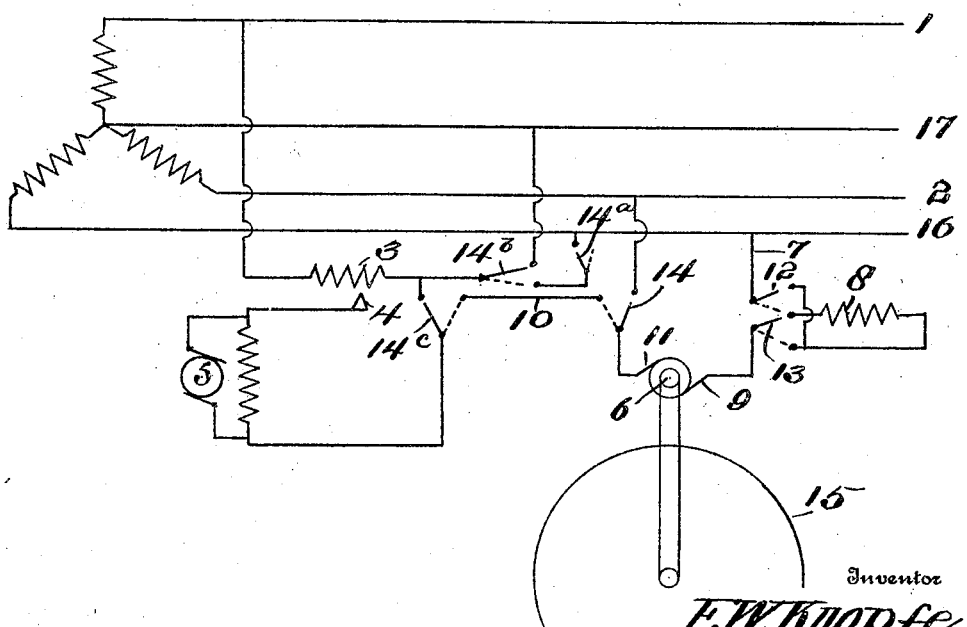

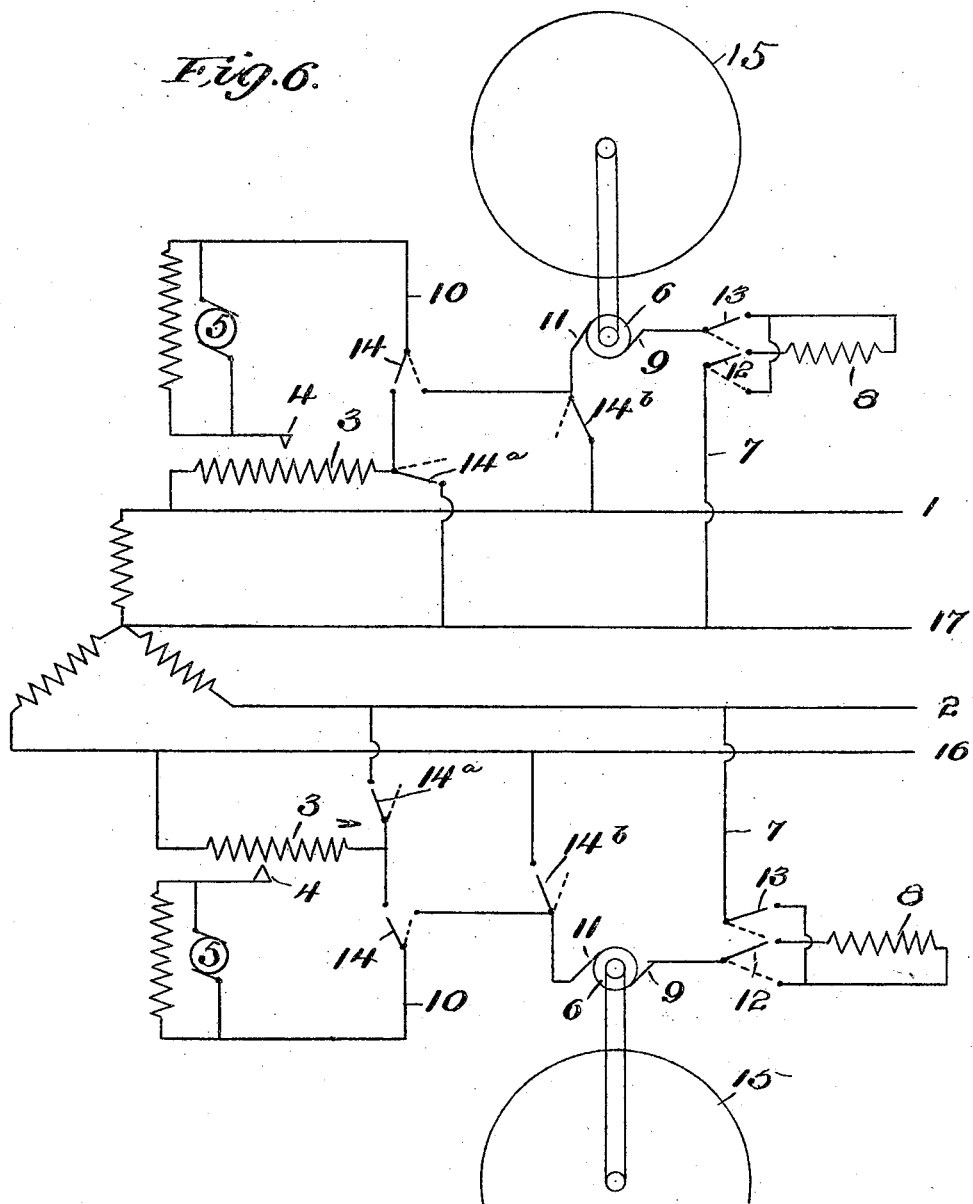

FREDERICK W. KNOPFE, OF ST. LOUIS, MISSOURI.

ELECTRIC MACHINE AND SYSTEM.

No. 820,649.          Specification of Letters Patent.          Patented May 15, 1906.

Application filed August 25, 1904. Serial No. 222,097.

*To all whom it may concern:*

Be it known that I, FREDERICK W. KNOPFE, a subject of the German Emperor, residing at the city of St. Louis, in the State of Missouri, have invented new and useful Improvements in Electric Machines and Systems, of which the following is a specification.

This invention relates to electric machines and systems, and especially to a non-synchronous alternating-current machine alternatively running as a motor and as a generator and connected with a fly-wheel, wherein mechanical energy is stored by the acceleration of the fly-wheel while the machine is running as a motor and the energy thus stored serving to operate the machine while running as a generator.

It is well known that where hoisting or similar machinery running under intermittent load is operated by electric motors many difficulties arise in the use of alternating currents. It is not feasible to connect such a working motor to alternating-current lines, as such intermittent load would disturb the voltage of the plant. The motors take heavy currents from the lines while starting and running, causing a drop of voltage, and when the motor is stopped the voltage suddenly rises.

The object of my invention is to provide a machine which when the working motor is idle runs as a motor and takes energy from the line and stores it as mechanical energy in its fly-wheel by the acceleration thereof. After the working machine is started my machine is transformed from a motor to a generator, and the mechanical energy stored in its fly-wheel is available to operate the generator, and to supply additional voltage to the working motor.

With this and other objects in view the present invention consists in the combination and arrangement of parts, as will hereinafter be more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
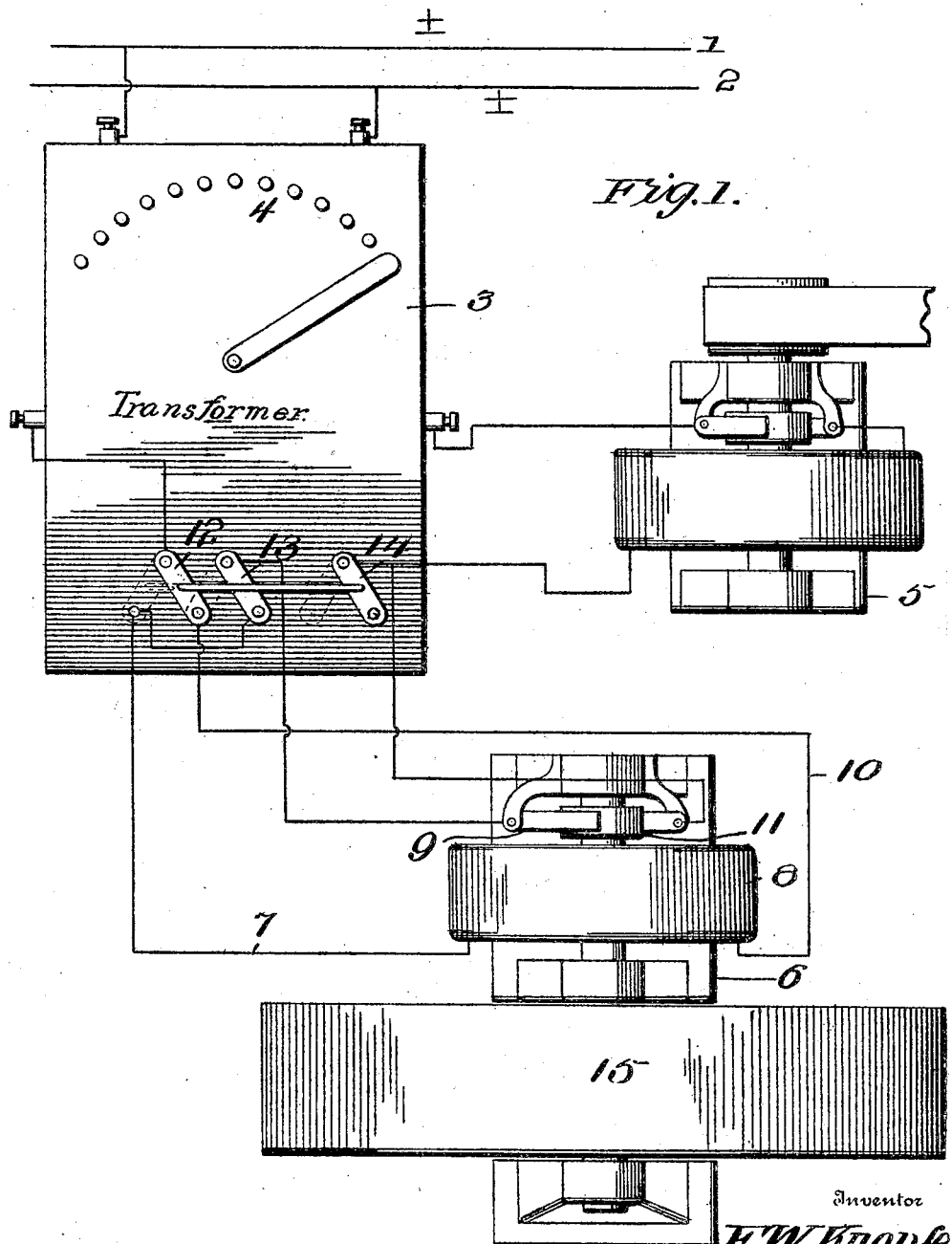

In the drawings, Figure 1 is a plan view of my improved electrical machine, showing its connection with a working motor through a combined switchboard and variable transformer. Figs. 2, 3, 4, 5, and 6 are diagrammatic views showing the manner of connecting my machine to single and multi phase lines and wherein different types of machines are used.

Like characters of reference designate corresponding parts throughout the several views.

It will be understood that my machine may be of any of the well-known types, as series, repulsion, or induction machine, and either straight or compensated. It is not necessary that the machine be a "straight" series, repulsion, or induction machine. On the contrary, it may be very advantageous to make it a compensated-series, or compensated-repulsion, or compensated-induction machine, and it is not necessary that it is the same kind of machine when running as generator as when running as a motor, as it could be used in any of the following combinations: the machine to run as a straight or compensated series motor and as a straight or compensated series or repulsion or induction generator; the machine to run as a straight or compensated repulsion motor and as a straight or compensated repulsion or series or induction generator; the machine to run as a straight or compensated induction motor and as a straight or compensated induction or series or repulsion generator. The essential part of my invention is in every case that the machine when running as a motor is connected to a certain voltage and when running as generator is connected in series with this same voltage, (if ohmic and inductive losses are not taken in consideration.)

It is not necessary that the machine when running as induction-generator have the same number of poles as when running as a series or repulsion motor. On the contrary, it may be very advantageous to change the number of poles. If the number of poles in the induction-generator be larger than in the series or repulsion motor, its synchronous speed is lower and its "margin" above synchronous speed is larger for the same reason.

For convenience I have shown my machine as a series-wound machine, except in Fig. 4, where I have shown the form of connection necessary or desirable for use in connection with a repulsion-machine and have therefore shown such a machine diagrammatically.

In the preferred installation of my machine I connect to line-wires 1 and 2, which are supposed to conduct an alternating current, the transformer 3. The transformer is connected with a controller 4 in such manner that a current of different voltage may be supplied to the working motor 5 in any of the usual well-known manners. My machine 6 is supplied with current from the transformer passing through switch 12 to the line 10, through the field 8, and through line 7, switch 13, and the brushes 9 and 11 and to the switch 14.

With the switches 12, 13, and 14 in full-line position, as shown, the current is supplied, as above described, to operate the machine 6 as a motor. The motor 5 may now be supplied with the transformed current, and when the said motor is receiving the entire voltage from the transformer the switches 12, 13, and 14 are thrown to dotted positions and the poles of the machine 6 thereby changed, so that the machine 6, continuing to run in the same direction and operated by the mechanical energy stored in the fly-wheel 15, is transformed to a generator to supply additional voltage to the motor 5 and being connected in series with the voltage of the transformer.

Figure 2:
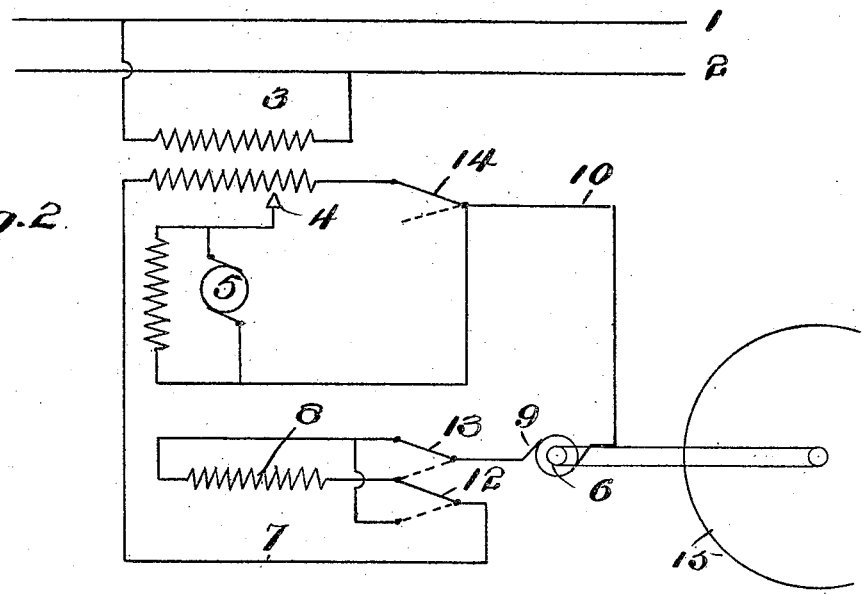
Figure 3:
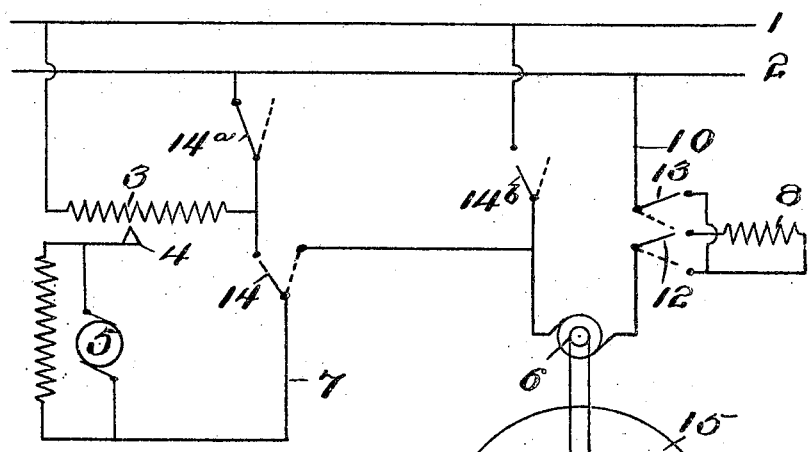

The foregoing description relative more especially to Fig. 2 is the usual and preferred form and connection of my machine, where a single-phase current is available and wherein a two-coil transformer of the usual type is used. It is often convenient to use a transformer of the single-coil type, and in Fig. 3 I have shown the connection desirable for use with such a transformer and in Fig. 4 the use of such a transformer and the machine of the repulsion type. In the repulsion-type machine it is extremely simple to change the motor to a generator, it being necessary only to shift the brushes in relation to the field or the field in relation to the brushes and not necessitating the changing of the poles, as above described.

In Figs. 3, 4, 5, and 6 the switch 14$^a$ is opened after the motor 5 is receiving the full voltage from the transformer and from the generator 6, thus cutting out the transformer 3, the current from the line passing directly and untransformed through the motor 5, to which is added in series the voltage from the generator 6.

In Fig. 5 I have shown the arrangement and connection of my machine as applied to a polyphase (three-phase) system and have again shown it for simplicity as a series-wound machine. In this form of connection the transformer 3 is connected in starting to the line 1 and the neutral line 17. Therefore in starting, the working motor 5 receives only a fraction of the line-voltage, while my machine 6 runs as a motor and receives the full line-voltage. When the action of the machine is changed from a motor to a generator and the motor 5 is running under the line-voltage 1-17, the switch 14$^b$ is thrown to dotted-line position, thus cutting in the full line-voltage 1-16. Therefore the generator 6 runs not in series with the voltage 1-17, but in series with the full line-voltage 1-16.

In Fig. 6 I have shown two of my machines connected to a polyphase system. This is often desirable if, for instance, a plurality of small motors are to be supplied with current of different phase and it is not deemed to be advantageous to install polyphase motors, and these motors may, if desired, be coupled together and be used instead of a polyphase machine.

My machine may be even a single or polyphase induction-machine, but then it must be provided to have the number of poles changed when running as motor and as generator. It drives its fly-wheel up to synchronous speed as motor with a smaller number of poles. After changing the connections it has a larger number of poles, and being driven by its fly-wheel it is running above synchronous speed and furnishing voltage as generator.

To more clearly demonstrate the operation of my machine, I give the following example, in which matters affecting the efficiency of the system, the phase difference between current and voltage, and the resistance are not taken into account. In the simplest-form single-phase machine, as shown at Fig. 2, let the voltage between 1 and 2 be considered as five hundred volts. The motor 5 with full load may require 100 amperes $\times$ 1,000 volts = 100 kilowatts. When the motor 5 does not run, my machine takes current from the lines 1 and 2 and runs as a motor to drive its fly-wheel. When the motor 5 starts, it may take, say, 200 amperes $\times$ 200 volts = 40 kilowatts. This low voltage is regulated and supplied through the regulating-transformer 4. The voltage which is supplied to the motor 5 is then gradually raised until such motor is receiving the full voltage of the transformer—five hundred volts—and then the motor may take, say, 100 amperes $\times$ 500 volts = 50 kilowatts; but it does not run at full speed, as it is not supplied with its proper voltage. The machine 6, which has been running as a motor and driving its fly-wheel, is changed to a generator and being driven by its fly-wheel is then furnishing voltage as a generator. The switches 12, 13, and 14 are thrown over to dotted-line position and connecting the machine 6 in series with a part of the voltage of the transformer 4, as at the same time the regulating-transformer is thrown to supply a current of low voltage to the machine 5. The machine 5 is then receiving the full voltage from the generator 6 and a small voltage from the transformer 4. The regulating-transformer is then gradually thrown to the large voltage until the entire voltage of the transformer is in series with the current from the generator 6. The motor 5 then receives 100 amperes × 500 volts = 50 kilowatts from the transformer, and the machine 6 running as a generator supplies five hundred volts more in series with the voltage of the transformer. Therefore the motor 5 is receiving for the short time it may be in operation 1,000 volts × 100 amperes = 100 kilowatts.

It is found desirable and productive of greatest efficiency to have the voltage of the machine when running as a generator equal to the voltage of the transformed current; but such equality of voltage is not necessary.

While I have shown several modified forms of connections, it is obvious that many other forms of connection may be made without departing from the spirit of my invention or the scope of the claims.

Having thus described my invention, what I claim as novel, and desire to secure by Letters Patent, is—

1. A system comprising in combination a conductor carrying an alternating electric current, a transformer located in said circuit capable of regulating said alternating current and a machine capable of being operated as a motor by said alternating current to store mechanical energy and of alternatively being operated by the mechanical energy so stored to generate electrical energy which is added to the electrical energy from the transformer to operate a motor intermittently.

2. A system comprising in combination a conductor carrying an alternating electric current, a transformer located in said circuit capable of regulating said alternating current, an electric motor capable of being transformed into a generator while running, means whereby when running as a motor mechanical energy is stored, capable of operating the machine when running as a generator and means whereby the electrical energy so generated is added to the electrical energy from the transformer to operate a motor intermittently.

3. A system comprising in combination a conductor carrying an alternating electric current, a transformer located in said circuit capable of regulating said alternating current, an electric motor, a fly-wheel mechanically connected with and operated by the motor, means whereby the motor may be transformed to a generator continuing to move in the same direction and operated by the mechanical energy stored in the fly-wheel while running as a motor and means whereby the electrical energy so generated is added to the electrical energy from the transformer to operate a motor intermittently.

In testimony whereof I affix my signature in presence of two subscribing witnesses.

FREDERICK W. KNOPFE.

Witnesses:
C. H. JOHNSON,
L. L. MORRILL.